United States Patent
Walker et al.

(10) Patent No.: US 8,781,893 B2
(45) Date of Patent: *Jul. 15, 2014

(54) SYSTEM AND METHOD FOR MANAGING CUSTOMIZED REWARD OFFERS

(71) Applicant: Inventor Holdings, LLC, Stamford, CT (US)

(72) Inventors: Jay S. Walker, Ridgefield, CT (US); Sanjay K. Jindal, Los Angeles, CA (US); Toby Weir-Jones, Scotts Valley, CA (US); Stephen C. Tulley, Monroe, CT (US); Michael D. Downs, Wilton, CT (US)

(73) Assignee: Inventor Holdings, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/857,520

(22) Filed: Apr. 5, 2013

(65) Prior Publication Data

US 2013/0218656 A1   Aug. 22, 2013

Related U.S. Application Data

(63) Continuation of application No. 13/366,797, filed on Feb. 6, 2012, now Pat. No. 8,423,400, which is a continuation of application No. 12/237,716, filed on Sep. 25, 2008, now Pat. No. 8,126,771, which is a continuation of application No. 10/218,157, filed on Aug. 12, 2002, now Pat. No. 7,430,521, which is a continuation-in-part of application No. 09/422,215, filed on Oct. 21, 1999, now Pat. No. 6,434,534, which is a continuation of application No. 08/921,868, filed on Aug. 28, 1997, now Pat. No. 6,018,718.

(51) Int. Cl.
*G06Q 30/00* (2012.01)
*G06Q 30/02* (2012.01)

(52) U.S. Cl.
CPC ........ *G06Q 30/0215* (2013.01); *G06Q 30/0226* (2013.01); *G06Q 30/0234* (2013.01)
USPC .................... 705/14.17; 705/14.27; 705/14.34

(58) Field of Classification Search
CPC .......... G06Q 30/0215; G06Q 30/0226; G06Q 30/0234
USPC ................................ 705/14.17, 14.27, 14.34
See application file for complete search history.

(56) References Cited

U.S. PATENT DOCUMENTS 4,876,592 A    10/1989  Von Kohorn
5,035,372 A *   7/1991  Siebertz ..................... 242/420.5

(Continued)

FOREIGN PATENT DOCUMENTS

EP           308224 A2 *   3/1989

OTHER PUBLICATIONS

Website: GE Capital Consumer Financial Services: downloaded date: Mar. 12, 1998, 1 page.*

(Continued)

*Primary Examiner* — Raquel Alvarez
(74) *Attorney, Agent, or Firm* — Michael D. Downs; Fincham Downs, LLC

(57) ABSTRACT

In accordance with some embodiments of the present invention, a method is provided for managing reward offers. A first performance target that is associated with a financial account is determined. Transaction data that is associated with the financial account is received, and a second performance target for the financial account is determined based on the transaction data.

35 Claims, 8 Drawing Sheets

(56) References Cited

U.S. PATENT DOCUMENTS

| | | | |
|---|---|---|---|
| 5,053,957 A | 10/1991 | Suzuki | |
| 5,056,019 A | 10/1991 | Schultz et al. | |
| 5,287,268 A | 2/1994 | McCarthy | |
| 5,297,026 A | 3/1994 | Hoffman | |
| 5,466,919 A | 11/1995 | Hovakimian | |
| 5,483,444 A | 1/1996 | Heintzeman et al. | |
| 5,537,314 A | 7/1996 | Kanter | |
| 5,621,640 A | 4/1997 | Burke | |
| 5,710,886 A | 1/1998 | Christensen et al. | |
| 6,018,718 A | 1/2000 | Walker et al. | |
| 7,384,336 B2 * | 6/2008 | Torango | 463/27 |

OTHER PUBLICATIONS

O'Hare, Brian, "Soundoff", The American Banker, Jul. 11, 1994, Section: Community Banking, 2 pp.

Sinton, Peter, "Pick a Card, but Not Just Any Card—Focus on rate, not rewards", The San Francisco Chronicle, Oct. 10, 1994, 5 pp.

Jones, Cliff, "Plastic Interest in Sweet Charity", The Guardian, Dec. 10, 1994, Section: The Guardian Money Page, 1 pg.

Child, Peter et al., "Can marketing regain the personal touch", McKinsey Quarterly, 1995, Section: No. 3, 11 pp.

"Drexel Alumni Affinity Card", MBNA America, Jan. 1, 1996, (http //alum ia drexel edu), 1 pg.

Greene, Jan, "They're Selling Your Secrets", The Orange County Register, Apr. 21, 1996, Section: News, 6 pp.

Jolis, Alan, "Grameen Bank, Bangladesh—The Good Banker", The Independent, May 5, 1996, 7 pp.

"Database Key To Consumer Retention Says New Report", Food Institute Report, May 13, 1996, Section: No. 18, 2 pp.

Website: "The Binghamton University Alumni Association MasterCard Credit Card", (http //www webapply com/bingu/apply html), download date: Jul. 21, 1996, 2 pp.

Website: "Bradesco Credit Cards : Affinity Cards: Closed Groups", (http //www bradesco corn br /veringl/ccard/affinity/closedc html), download date: Jul. 21, 1996, 2 pp.

Website: "MasterCard Affinity Card", McGill MasterCard, (http //www mcgill ca/alumni/m_card htm), download date: Jul. 21, 1996, 2 pp.

"The Winner At A Glance", Card News, Sep. 30, 1996, 2 pp.

Website: "AAA Michigan Savings", Automobile Club of Michigan, (http //www aaamich com/savings/group/index html), download date: Mar. 25, 1997, 2 pp.

O'Malley, Chris, "RCA seeks to collar the affinity credit-card market", The Indianapolis Star, Mar. 28, 1997, 2 pp.

Sanders, Edmund, "Card Sharks", The Orange County Register, Jun. 15, 1997, 6 pp.

"Choosing a credit card", The Times, Jul. 5, 1997, 2 pp.

Website: "BCAA Auto Related Products", (http //www bcaa bc ca/auto/body_auto_prod html), download date: Mar. 12, 1998, 1 pg.

Website: "CASHMAX", Centura CashMax Card, (http //www centura com/cashcards/cashmax html), download date: Mar. 12, 1998, 5 pp.

Website: "Citibank Cards and Services", (http //www citibank com/us/cards/crd_svc/citicard/), download date: Mar. 12, 1998, 5 pp.

Website: "Citibank Driver's Edge—Earnings & Redeeming . . . ", (http //www citibank com/us/cards/drivers-edge/earning htm), download date: Mar. 12, 1998, 4 pp.

Website: "Credit Cards—State Capitol Credit Union", (http //www capitolcu org/credcard html), download date: Mar. 12, 1998, 1 pg.

Website: "Customer Rewards", Chase Gold Visa, (http www chase com/goldvise/rewards html), download date: Mar. 12, 1998, 2 pp.

Website: "Discover Card Features", (http //www discovercard com/discover/data/features htm), download date: Mar. 12, 1998, 1 pg.

WebsiteL "Kmart: Kmart Credit Card Rewards", (http //www kmart com/a%5Fprod/a1%5Fcre/ala%5Frew/ala%5Fct stm), download date: Mar. 12, 1998, 2 pp.

Website: "Mobil Speedpass/Mobil Fleet/Mobil Business Credit Cards", (http //www mobil com /business/credit/fleet/product html), download date: Mar. 12, 1998, 1 pg.

"New Partners, more exciting rewards: The Membership Rewards program for 1998.", America Express, (http //www Americanexpress com/rewards/news/docs/1998new_mr shtml), download date: Mar. 12, 1998, 38 pp.

Notice of Allowance for U.S. Appl. No. 10/218,157 mailed May 21, 2008, 7 pp.

Office Action for U.S. Appl. No. 10/218,157 mailed Nov. 28, 2007, 5 pp.

Notice of Allowability for U.S. Appl. No. 09/422,415 mailed Mar. 12, 2002, 3 pp.

Office Action for U.S. Appl. No. 08/422,415 mailed Jul. 31, 2001, 7 pp.

Notice of Allowability for U.S. Appl. No. 08/921,868 mailed Oct. 1, 1999, 1 pg.

Office Action for U.S. Appl. No. 08/921,868 mailed Mar. 31, 1999, 6 pp.

Notice of Allowance for U.S. Appl. No. 12/237,716 mailed Nov. 30, 2011, 8 pp.

Notice of Allowance for U.S. Appl. No. 12/237,716 mailed Nov. 7, 2011, 8 pp.

Office Action for U.S. Appl. No. 12/237,716 mailed May 4, 2011, 11 pp.

Notice of Allowance for U.S. Appl. No. 13/366,797 mailed Dec. 17, 2012, 8 pp.

* cited by examiner

| ACCOUNT ID 310 | CARD HOLDER NAME 312 | ADDRESS 314 | TELEPHONE NUMBER 316 | TOTAL CREDIT LINE 318 | AVAILABLE CREDIT LINE 320 | AVERAGE QUARTERLY CHARGE VOLUME 322 | AVERAGE QUARTERLY OUTSTANDING BALANCE 324 | AVERAGE TRANSACTIONS PER MONTH 326 |
|---|---|---|---|---|---|---|---|---|
| 2222-3333-4444-5555 | TIM SMITH | 99 MAIN ST. HOMETOWN, CT 22222 | (333) 444-5555 | $2,000 | $1,233 | $1,000 | $500 | 8 |
| 9999-9999-9999-9999 | SUE C. CARDHOLDER | 10 CENTER ST. ROCKPORT, NJ 99999 | (999) 111-2222 | $3,500 | $0 | $3,000 | $2,000 | 20 |
| 7777-3333-2222-1111 | JOHN JOHNSON | JJ@ISP.COM | (222) 111-2222 | $10,000 | $10,000 | $4,000 | $0 | 35 |

| ACCOUNT ID 410 | TARGET PERIOD 412 | TARGET TYPE 414 | TARGET PARAMETER 416 | REWARD TYPE 418 | REWARD TERMS 420 | STATUS 422 |
|---|---|---|---|---|---|---|
| 2222-3333-4444-5555 | 1ST QUARTER 1997 | QUARTERLY CHARGE VOLUME | $1,500 | CASH REBATE | 2% FOR CHARGES OVER TARGET | YES |
| 9999-9999-9999-9999 | 1ST QUARTER 1997 | QUARTERLY OUTSTANDING BALANCE | $2,500 | FREQUENT FLYER MILES | 1 MILE PER DOLLAR FOR BALANCE ABOVE TARGET | NO |
| 7777-3333-2222-1111 | 1ST QUARTER 1997 | MONTHLY TRANSACTIONS | 45 | APR REDUCTION | 12.9% APR FOR 6 MONTHS | YES |
| 2222-3333-4444-5555 | 2ND QUARTER 1997 | QUARTERLY CHARGE VOLUME | $1,750 | CASH REBATE | 2% FOR CHARGES OVER TARGET | NO |
| 9999-9999-9999-9999 | 2ND QUARTER 1997 | QUARTERLY OUTSTANDING BALANCE | $2,000 | FREQUENT FLYER MILES | 1 MILE PER DOLLAR FOR BALANCE OVER TARGET | NO |
| 7777-3333-2222-1111 | 2ND QUARTER 1997 | MONTHLY TRANSACTIONS | 50 | APR REDUCTION | 11.9% APR FOR 6 MONTHS | NO |

400

450

| TRANSACTION ID 508 | ACCOUNT ID 510 | MERCHANT ID NUMBER 512 | TRANSACTION AMOUNT 514 | DATE 516 | TIME 518 | CREDIT CARD AUTHORIZATION NUMBER 522 |
|---|---|---|---|---|---|---|
| 11223333 | 2222-3333-4444-5555 | 22334 | $19.75 | 2/15/97 | 3:05 PM | 4062 |
| 11324444 | 2222-3333-4444-5555 | 32454 | $38.25 | 3/10/97 | 1:30 AM | 4321 |
| 11547889 | 2222-3333-4444-5555 | 13987 | $45.84 | 3/11/97 | 4:16 PM | 1156 |
| 43219876 | 2222-3333-4444-5555 | 48965 | $235.18 | 3/14/97 | 10:15 AM | 9587 |
| 56781234 | 7777-3333-2222-1111 | 32340 | $36.75 | 3/6/97 | 1:26 PM | 0613 |
| 96385274 | 9999-8888-9999-9999 | 93407 | $401.60 | 2/28/97 | 12:07 AM | 6460 |

SYSTEM AND METHOD FOR MANAGING CUSTOMIZED REWARD OFFERS

The present application is a continuation of U.S. patent application Ser. No. 13/366,797 filed Feb. 6, 2012 entitled "SYSTEM AND METHOD FOR MANAGING CUSTOMIZED REWARD OFFERS", which is a continuation of U.S. patent application Ser. No. 12/237,716 filed Sep. 25, 2008 and now issued as U.S. Pat. No. 8,126,771 on Feb. 28, 2012, entitled "SYSTEM AND METHOD FOR MANAGING CUSTOMIZED REWARD OFFERS", which is a continuation of U.S. patent application Ser. No. 10/218,157, filed Aug. 12, 2002 and issued as U.S. Pat. No. 7,430,521 on Sep. 30, 2008, which is a continuation-in-part of U.S. patent application Ser. No. 09/422,415, filed Oct. 21, 1999, entitled "METHOD AND SYSTEM FOR PROCESSING CUSTOMIZED REWARD OFFERS" and issued as U.S. Pat. No. 6,434,534 on Aug. 13, 2002; which is a continuation of U.S. patent application Ser. No. 08/921,868, filed Aug. 28, 1997 and issued as U.S. Pat. No. 6,018,718 on Jan. 25, 2000. Each of the above-referenced applications is incorporated by reference herein in its entirety.

FIELD OF INVENTION

The present invention relates generally to methods and systems for promoting the use of financial accounts. More particularly, the present invention relates to a method and system which facilitates generating, communicating and managing a customized reward offer presented to an account holder.

BACKGROUND OF THE INVENTION

Methods and systems for promoting usage of credit card accounts are well known. Such methods and systems are generally designed to reward a credit card holder for exhibiting behavior preferred by a credit card issuer. Credit card reward programs typically fall into one of three categories: reward accrual programs, tiered reward programs and specialty programs.

Reward accrual programs promote usage of a credit card account by rewarding a card holder for account usage with either rebates or redeemable program points. In such programs, account usage is typically measured as a function of either total charge volume or total revolving credit. Generally, card holder performance is measured monthly, and rewards are distributed based on the monthly measurements.

Tiered reward programs promote usage of a credit card account by rewarding a card holder for account usage at certain predefined levels. Like other reward programs, account usage is usually measured as a function of either total charge volume or total revolving credit, but tiered reward programs distribute rewards only to those card holders performing above certain performance levels. In many tiered reward programs, several performance levels are established by the issuer with each performance level having an associated reward.

Recently, some credit card issuers have implemented specialty programs which are tailored to a particular group of card holders. GE Capital, for example, has introduced the "GE Capital Gains Card" which is a travel and entertainment card that rewards card holders for saving rather than spending money. GE offers a card holder bonus points redeemable for airline tickets or gifts if the card holder conforms to behaviors identified by the card holder's company. For example, if a card holder conforms to a corporate travel policy by flying with a preferred carrier or staying at a preferred hotel, the card holder will be awarded points.

BRIEF DESCRIPTION OF THE DRAWINGS

FIG. 3 is a table illustrating the structure of an exemplary card holder account table stored at the credit card issuer central controller.

FIG. 4 is a table illustrating the structure of an exemplary performance target table stored at the credit card issuer central controller.

DETAILED DESCRIPTION

In one or more embodiments of the present invention, a method is provided for managing reward offers. A first performance target that is associated with a financial account is determined. Transaction data that is associated with the financial account is received, and a second performance target for the financial account is determined based on the transaction data.

In other embodiments, a first performance target that is associated with a financial account is determined. Transaction data that is associated with the financial account is received, and it is determined whether a card holder associated with the financial account is eligible for a reward based on the first performance target and the transaction data. Also, a second performance target for the financial account is determined based on the transaction data. In some embodiments, account data that is associated with the financial account is also determined.

Some embodiments of the present invention provide the benefit of giving a card holder a definite periodic performance target. Also, in various embodiments, different types of rewards and/or different levels of rewards may be provided to different card holders, as some card holders may be more interested in a particular type or level of reward than other card holders. For example, a card holder who is not interested in offered rewards may not be motivated to perform at a higher level. One or more embodiments of the present invention provide for customizing programs to the preferences of the individual card holders. Thus, rewards need not be predefined for an entire population of participating card holders.

Various embodiments of the present invention may provide the benefit that the type of activity or behavior to be encouraged may be based on the individual profile of the card holder. Without analyzing the profile of a card holder, in some cases an issuer's reward program could be increasing the risk of default on a marginal quality account by encouraging increased card usage. For example, by encouraging revolving charges, some card holders with below average credit credentials may be encouraged to over-extend themselves. In such a circumstance, a card holder actually may be encouraged to behave in a manner that is detrimental to the credit card issuer. Thus, according to some embodiments, individualized performance targets may be set for each card holder, based on the card holder's transaction history and/or preferences.

1. System

Figure 1:
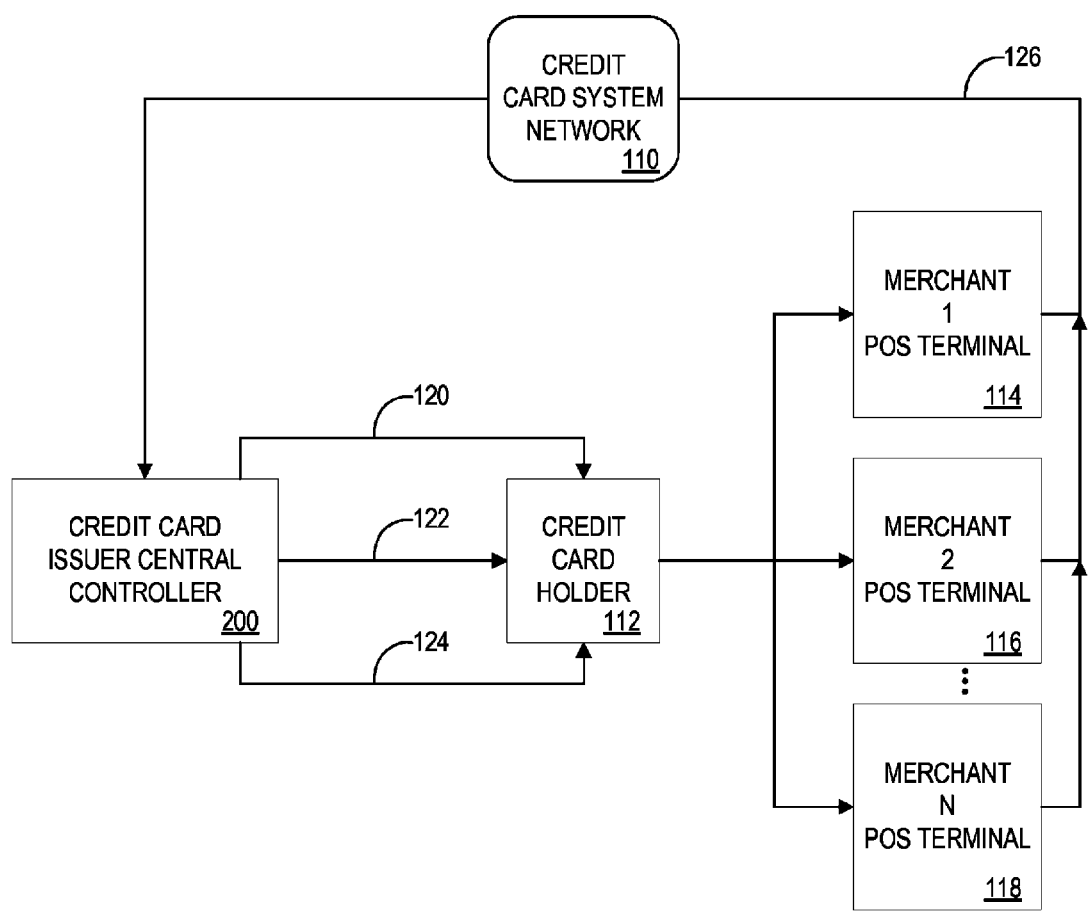
FIG. 1 is a schematic block diagram illustrating the information flow between parties according to one or more embodiments of the present invention.

Methods and systems according to various embodiments of the present invention will now be discussed with reference to FIGS. 1-8. FIG. 1 illustrates, in schematic block diagram format, the information flow between relevant parties according to one embodiment of the present invention. As shown, a credit card issuer central controller ("CCI") 200 transmits information to a credit card holder 112. Although such information may be transmitted electronically, it is preferably transmitted via a periodic account statement (not shown).

According to one embodiment, CCI 200 accesses stored historical account data associated with the account of credit card holder 112 and determines a first performance target for credit card holder 112. CCI 200 then selects a reward to offer credit card holder 112 if he behaves in accordance with the first performance target. As shown in FIG. 1, this first customized reward offer, including the first performance target, an indication of the reward being offered (e.g., a description of the reward, an indication of the reward terms) and a first target period, is transmitted to credit card holder 112 as indicated by reference numeral 120.

After receiving the transmission of the customized reward offer from CCI 200, credit card holder 112 may initiate and complete transactions affecting the credit card account in an effort to achieve the communicated first performance target. Transactions may be conducted, for example, with various merchants using point-of-sale ("POS") terminals 114, 116 and 118. As indicated by reference numeral 126, CCI 200 collects transaction data from POS terminals 114, 116 and 118 through a conventional credit card system network ("POS network") 110. This transaction data is stored by CCI 200 and is used to manage the account of credit card holder 112.

In some embodiments, CCI 200 evaluates the collected transaction data to determine a second performance target for credit card holder 112 prior to the end of the first target period. In alternate embodiments, the determination of the second performance target could be completed at or subsequent to the end of the first target period. The determination of the second performance target preferably is based on the first performance target and the transaction information collected since the transmission of the first customized reward offer. Alternatively, the determination of the second performance target may be based on the historical transaction data associated with the account of credit card holder 112, on other credit card holder profile data, on the first performance target, on the transaction information collected, or on any combination thereof. After determining the second performance target, CCI 200 transmits to credit card holder 112 a second customized reward offer identified by reference numeral 122. This second transmission includes the second performance target, an indication of the reward being offered (e.g., a description of the reward, an indication of the reward terms) and a second target period.

Upon expiration of the first reward offer, CCI 200 compares the first performance target to the transaction data collected since the transmission of the first reward offer. If credit card holder 112 has achieved the first performance target, CCI 200 updates the credit card holder account to reflect the reward. In some embodiments, CCI 200 transmits to credit card holder 112 an announcement of the reward earned by credit card holder 112 for achieving the first performance target.

FIG. 1 depicts only an embodiment of the invention. Other arrangements of devices to perform various methods specified herein will be readily appreciated by those of skill in the art.

Figure 2:
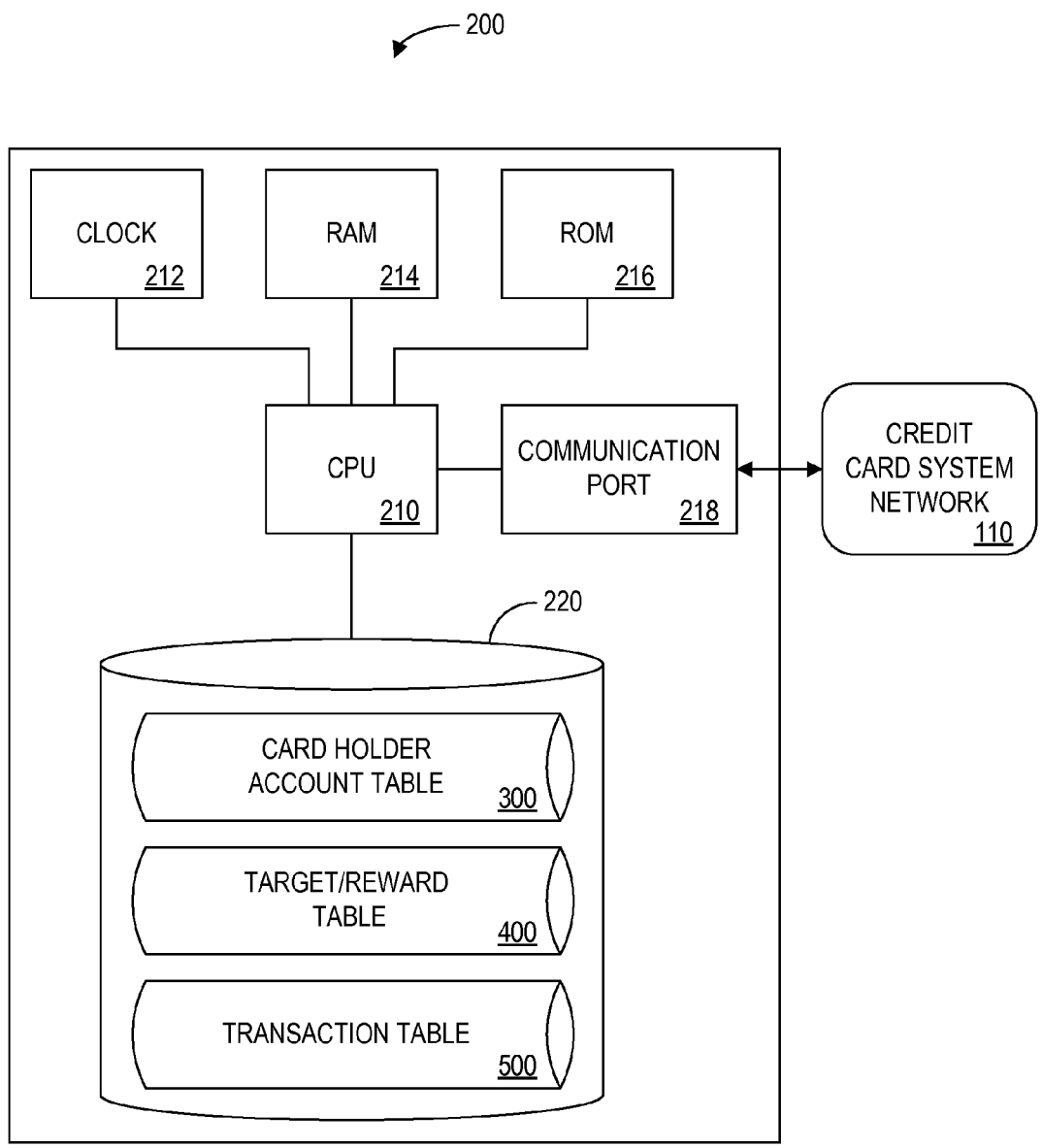
FIG. 2 is a schematic block diagram illustrating the components of a credit card issuer central controller according to one or more embodiments of the present invention.

Referring now to FIG. 2, CCI 200 is illustrated in greater detail, in accordance with various embodiments. As shown, CCI 200 includes a central processing unit ("CPU") 210, a clock 212, a random access memory ("RAM") 214, a read only memory ("ROM") 216, a communication port 218, and a storage device 220. Communication port 218 provides a connection between CCI 200 and POS network 110 allowing one-way or two-way communication between CCI 200 and POS network 110.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

As shown in FIG. 2, storage device 220 stores a database of account, target and reward data, including a card holder account table 300; a target/reward table 400; and a transaction table 500. Tables 300, 400 and 500 comprise at least a portion of the database stored by storage device 220 and are described more fully with reference to FIGS. 3, 4 and 5 respectively. Storage device 220 is preferably a magnetic disk drive, but could be a CD-ROM drive, optical disk drive, RAM drive or any other conventional storage device.

The databases are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. For example, those skilled in the art will understand that the number and/or content of the databases can be different from those illustrated herein. Similarly, the illustrated entries of the databases represent exemplary information only; those skilled in the art will understand that the number and/or content of the entries can be different from those illustrated herein. Based on the present disclosure many other arrangements of data will be readily understood by those of skill in the art.

2. Databases

FIG. 3 illustrates an example of the contents of card holder account table 300 in a representative tabular format. Those skilled in the art will understand that the card holder account table 300 may include any number of entries or records. Each record of representative account table 300 represents information pertaining to a card holder account. This information may be considered an account header in the art and includes the following six information elements: account ID field 310; card holder name element 312; address element 314; telephone number field 316; credit line field 318; and available credit field 320.

Account ID field 310 stores a unique account identifier. Account ID field 310 is assigned by the credit card issuer to uniquely identify an account of a card holder. In some embodiments, the unique account identifier will be a standard 16 digit credit card account number.

Card holder name element 312 stores the name of a card holder 112 who is responsible for the account described by the account table record. Card holder name element may be a single field, but will more likely be a combination of fields.

Address element 314 stores the mailing address of the card holder. Although some embodiments may include only one address element, or only one type of address, it may be useful to provide multiple address elements and/or other types of addresses to accommodate a home address, a billing address, an email address, and/or a business address. Address element 314 may be a single field, but will more likely be a combination of fields.

Telephone number field 316 stores the home telephone number of the card holder 112 responsible for the account. Additional telephone numbers, such as office and facsimile numbers, may also be stored in account table 300.

Total credit line field 318 stores the maximum amount of credit that the credit card issuer has provided to the card holder responsible for the account. Available credit line field 320 stores the amount of unused credit available to the credit card holder responsible for the account. Although available credit line field 320 is stored in account table 300 in one or more embodiments, this information could easily be calculated as necessary by subtracting the outstanding balance from the contents of total credit line field 318.

Some embodiments of the invention further include average quarterly charge volume field 322, average quarterly outstanding balance field 324 and average transactions per month field 326, all containing data which describe various characteristics of an account. These fields are populated by CCI 200 based on data maintained in transaction table 500, and may be used as predictors of future account activity. The contents of these fields are self-explanatory and may be derived in a variety of well known ways.

Other characteristics of an account (e.g., average balance transfer, average principal payment amount, average finance charge amount, a period of time the account has been active) will be known to those of skill in the art.

Although six fields are depicted in FIG. 3, not all of the fields depicted in FIG. 3 are required, and various substitutions, deletions and other changes to the tabular representation will be readily apparent to those of ordinary skill in the art. For example, the average transactions per month is not needed in many embodiments. The depicted fields, for example, the averages, are for illustration only. Various other types of account data are described herein and still others will be readily apparent to those of skill in the art.

FIG. 4 illustrates an example of the contents of target/reward table 400. Each record of representative target/reward table 400 represents information pertaining to a performance target and corresponding reward offered to a particular card holder account. Those skilled in the art will understand that the target/reward table 400 may include any number of entries or records. This table allows a credit card issuer to set, track, evaluate and reward the desired performance of a card holder and includes the following seven information elements: account ID field 410; period element 412; target type field 414; target parameter field 416; reward type field 418; reward terms element 420; and status field 422. The fields of target/reward table 400 are populated with values determined by the credit card issuer. The steps for determining these values are described in more detail with reference to FIG. 6.

Account ID field 410 stores a unique account identifier that uniquely identifies an account of a card holder. Target period element 412 identifies the period of time which a credit card holder is provided to achieve a defined target. In the example shown in FIG. 4, target period element 412 is based on calendar quarters. In alternative embodiments, however, the target periods could be months, years or based on specific start and end dates.

Target type field 414 stores a code representing a type of target assigned to an account identified by account ID field 410. Although field 414 typically only contains a code, the contents of field 414 illustrated in FIG. 4 show the logical representations of the target type. The type of performance target applicable to a card holder account is generally selected from a set of target types defined by the credit card issuer. In the example shown in FIG. 4, target type field 414 may store a code representing a target quarterly charge volume, a target quarterly outstanding balance, and a target number of transactions per month.

Of course, credit card issuers may define numerous alternative target types including, but not limited to, target monthly principal payments, target number and/or volume of purchases at specific merchants (or types of merchants), target balance transfer amounts from the card holder's account (e.g., a maximum amount transferred from the card holder's account), target balance transfer amounts from other accounts (e.g., a minimum amount transferred to the card holder's account from other accounts), and target period of time the account remains open or active.

For example, in accordance with one or more embodiments of the present invention, a performance target may define an amount of funds to be transferred to the card holder's account from another account (e.g., from an account maintained by a second card issuer). The amount of transferred funds may qualify the account holder to receive a reward such as a reduction in APR charged against the card holder's account to which the funds were transferred. For example, a reward offer may inform the card holder that he can receive a 0.5% reduction in APR charged against his account (including all of or a portion of any outstanding balances) in exchange for each $1,000 transferred from other accounts (e.g., from other accounts maintained by the same credit card issuer, or from accounts maintained by other issuers).

Target parameter field 416 stores the performance level at which a card holder must perform during the period identified by target period element 412 to achieve a reward. The data stored in target parameter field 416 is used to determine whether a card holder has achieved the target set by the credit card issuer.

Reward type field 418 stores a code representing a type of reward offered to a card holder responsible for the account identified by account ID field 410 for the target period 412. Like target type field 414, reward type field 418 typically only contains a code. The logical representations of the code of field 418 are illustrated in FIG. 4. As shown, the example reward types illustrated in FIG. 4 include a cash rebate reward, a frequent flyer mile reward and an APR reduction reward. Numerous alternative reward types are possible, including without limitation magazine subscriptions, free gifts and discount coupons.

Reward terms field 420 stores a code representing the terms of the reward associated with the record. CCI 200 uses the data of reward terms field 420 to provide rewards to a credit card account in the event the performance target has been achieved. The meaning of reward terms field 420 is interpreted based, in part, on the value of reward type field 418.

In at least one embodiment of the invention, reward status field 422 is included to store a code indicating whether the performance target for the account has been satisfied.

Although seven fields are depicted in FIG. 4, not all of the fields depicted in FIG. 4 are required, and various substitutions, deletions and other changes to the tabular representation will be readily apparent to those of ordinary skill in the art. For example, the reward status field is not needed in many embodiments. The depicted fields, for example, the target types, are for illustration only. Various other types of targets are described herein and still others will be readily apparent to those of skill in the art.

Figure 5:
FIG. 5 is a table illustrating the structure of an exemplary target/reward table stored at the credit card issuer central controller.

Referring now to FIG. 5, there is illustrated an example the contents of a representative transaction table 500. Each record of representative transaction table 500 represents a transaction between a credit card holder and a merchant. Those skilled in the art will understand that the transaction table 500 may include any number of entries or records. Transaction table 500 includes the following seven fields: transaction ID field 508; account ID field 510; merchant ID field 512; transaction amount field 514; date field 516; time field 518; transaction authorization number field 520; and credit card authorization number 522. Transaction table 500 may be used to analyze the account activity of each account stored in card holder account table 300. Analysis of account activity may be performed in any number ways well known by one of ordinary skill in the credit card processing field.

Although seven fields are depicted in FIG. 5, not all of the fields depicted in FIG. 5 are required, and various substitutions, deletions and other changes to the tabular representation will be readily apparent to those of ordinary skill in the art. For example, the time field is not needed in many embodiments. The depicted fields, for example, the merchant identifiers, are for illustration only. Various other types of identifiers will be readily apparent to those of skill in the art.

3. Processes

Having thus described the system architecture and components of various embodiments, the operation of the system according to various embodiments will now be described in greater detail with reference to FIGS. 6-8, and continuing reference to FIGS. 1-5. It is to be understood that the software instructions (not shown) necessary to provide the functionality described herein are preferably stored in ROM 216 or storage device 220 of CCI 200.

Figure 6:
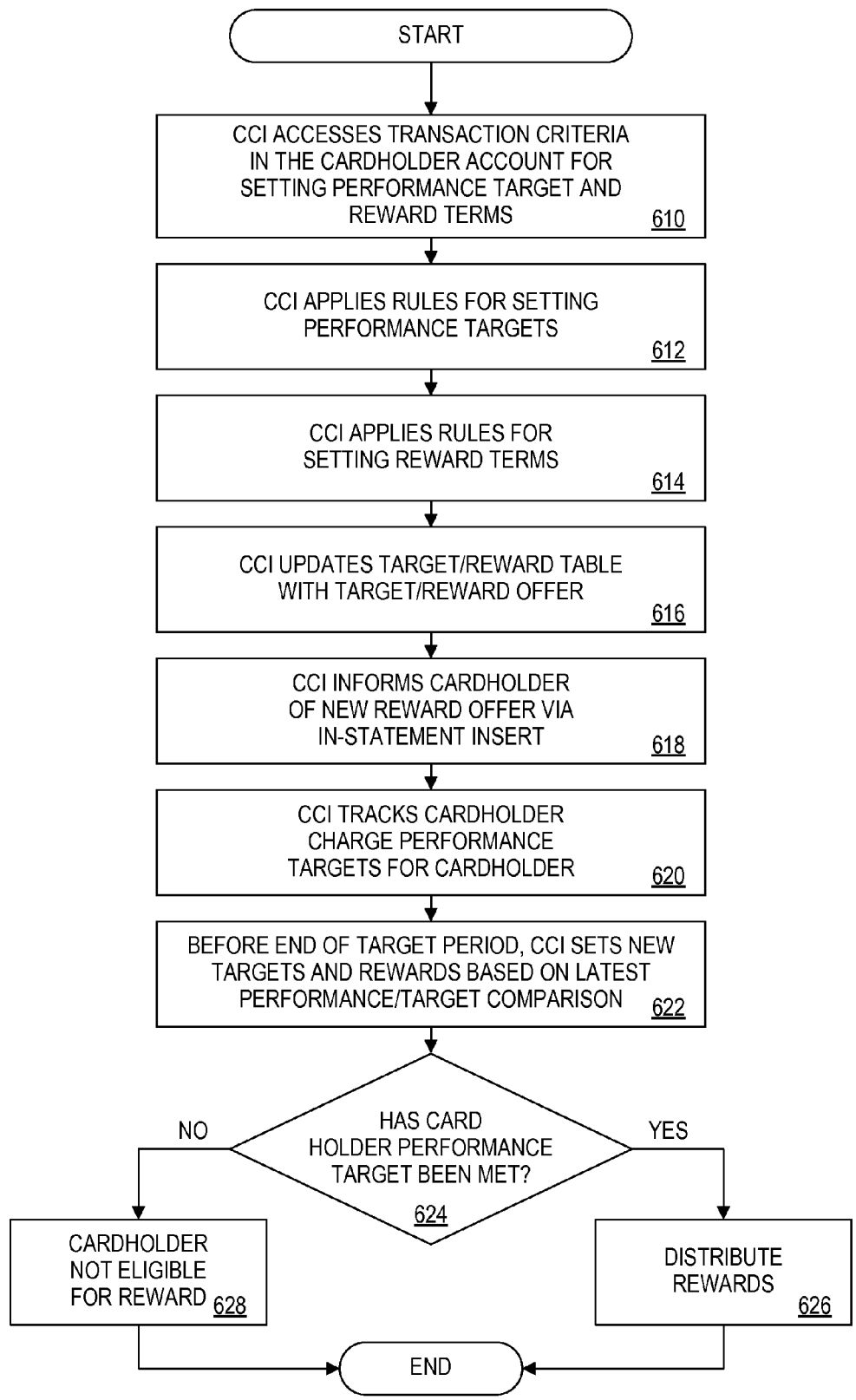
FIG. 6 is a flow chart illustrating the computer implemented steps used to set customized rewards according to one or more embodiments of the present invention.

Referring now to FIG. 6, a process according to one or more embodiments of the present invention will be described. As shown at step 610, CCI 200 accesses data stored in card holder account table 300 for setting performance targets. The criteria referred to at step 610 includes fields 322, 324 and 326. As previously indicated, these fields are populated by CCI 200 based on an analysis of records in transaction table 500. Although specific criteria are identified in FIG. 6, the criteria may be any information that an issuer believes to be indicative of particular card holder behavior. The criteria forms the basis for determining performance targets, reward terms or both.

One method presently employed by credit card issuers to predict and influence card holder behavior is determining a score defined by a scoring system. Scoring systems are mathematical models designed to provide probabilities of future performance based on a creditor's actual historic performance. Models are developed from past behavior and data relationships and are used to identify predictive variables. Scoring systems can be used as absolute decision tools or in combination with judgmental and expert system rules.

Credit card issuers are currently using scores to determine: who will respond to an offer; who will reliably repay credit; and who will generate revenue for a lender. These scores are known as response scores, risk scores and revenue scores, respectively. Response Scores are used to determine how to modify solicitations for maximum results and for areas of the country that have the greatest growth potential for specifically designed card products like insurance or investment cross-sells. Risk Scores are used to predict delinquencies and bankruptcies. They are also used to predict the extent and timing of monthly payments. Revenue scores assign a ranking to individuals by the relative amount of revenue they are likely to produce over a period of time following score assignment. Revenue scores help issuers in account management by identifying inactive accounts that ought to be targeted with an appropriate offer and by identifying the most desirable prospects for acquisition.

A score may also be classified as either a credit score or a behavior score. A credit score is a statistical measure used by creditors to determine whether to extend credit in the form of a loan or as a credit line on a credit card. Credit scores takes into account many factors, including: annual income, years at current job, residence, debt payment history, current debt obligations and long term debt obligations. Creditors may assign different weights to these criteria to compute a credit score.

A behavior score is another statistical measure used by issuers to better manage individual accounts to maximize profit per account. The behavior score can include more than 50 different characteristics, including: extent of monthly payments, promptness of payment, use of card for purchases or cash advances, size and type of purchases and types of spending categories among others.

One way to select relevant criteria for setting performance targets is illustrated at step 610, wherein CCI 200 accesses account data derived from historic transaction data such as average quarterly charge volume 322, average quarterly outstanding balance 324 and average number of monthly transactions 326. CCI 200 then accesses rules for setting performance targets at step 612. These rules may be stored in a database or otherwise implemented through software. These rules are applied against the criteria determined at step 610. Illustrative examples of rules for setting performance targets are described with reference to Table I, below.

TABLE I

Rules for setting performance targets

| Rule | Target Type | Target Parameter |
|---|---|---|
| If quarterly charge volume (x) is less than a predetermined minimum volume | Quarterly charge volume | Target charge volume = mx |
| If quarterly outstanding balance (y) is less than a predetermined percentage of total credit line | Quarterly outstanding balance | Target quarterly outstanding balance = ny |
| If transactions per month (z) is less than a predetermined minimum number | Transactions per month | Target transactions per month = pz |

To apply the first rule of Table I, CCI 200 must determine a quarterly charge volume for a subject account as one of the criteria determined at step 610. At step 612, the determined quarterly charge volume is compared to a predetermined minimum volume. If the determined volume is less than the minimum, a target quarterly charge volume will be set for the account. The target quarterly charge volume will be equal to the determined quarterly charge volume of the account times a multiplier m. Application of the remaining two rules is accomplished in a similar fashion, where m, n and p are numbers greater than zero.

The quarterly charge volume, quarterly outstanding balance and number of transactions per month are readily calculated by one having ordinary skill in the art. Of course, the rules of Table I are merely simple illustrative examples of the numerous rules which could be implemented by a credit card issuer, depending on its particular needs. It will also be understood that multipliers m, n and p may vary for each account.

It should be recognized that multiple targets and rewards could be determined for some or all card holder accounts. It should also be recognized that credit card issuers are not limited to the criteria defined herein. The criteria on which targets are determined may be based on a credit card issuer's interpretation of behavior and revenue scores for the account, on a combination of scores and specific behavior indicators, such as those shown in card holder account table 300, or on any other predictive variable.

At step 614, CCI 200 accesses rules for setting reward terms. Like the rules for setting performance targets, these rules may be stored in a database or otherwise implemented through software and are applied against the criteria determined at step 610. Illustrative examples of rules for setting reward terms are described with reference to Table II, below.

TABLE II

Rules for setting reward terms

| Rule | Reward Type | Reward Offer |
| --- | --- | --- |
| If current cash rebate is j percent | Cash rebate | Reward offer = qj |
| If frequent flyer mile level equals 1 mile per dollar charged | Frequent flyer miles | Reward offer = 1.5 miles per dollar charged |
| If current APR equals 19% | Reduced APR | Reward offer = 18% APR |

To apply the first rule of Table II, CCI 200 must determine the current cash rebate percentage corresponding to a subject account as one of the criteria determined during step 610. The determined cash rebate percentage may be a global parameter that applies to all accounts; it may be a parameter that is customized for each account; or it may be otherwise calculated. At step 612, the determined cash rebate percentage is multiplied by a variable q to set the reward terms where j and q are numbers greater than zero. Application of the remaining two rules is accomplished in a similar fashion.

While the rules of Table II are provided as simple illustrative examples of rules for setting reward terms, numerous other rules could be implemented by a credit card issuer, depending on its particular needs. For example, the credit card issuer could use card holder input to select and set reward terms. One way of collecting card holder input is by providing a card holder a menu of reward options from which to select preferences. In addition, it should be recognized that a mechanism for selecting between rules could be easily implemented by a credit card issuer, and could be based on issuer preferences, mutual exclusivity of rules or any other selection mechanism.

At step 616, CCI 200 updates target/reward table 400 to reflect the target and reward terms. Specifically, CCI 200 adds a new record to target/reward table 400 and populates field 410 with the subject account ID; element 412 with data indicating the period of the target and reward offer; fields 414 and 416 with the target type and target parameter determined at step 612; and fields 418 and 420 with the reward type and reward terms determined at step 614.

As shown, at step 618, CCI 200 outputs a periodic account statement to inform card holder 112 of the reward offer. The periodic account statement includes the performance target, the target period and the reward terms to induce card holder 112 to behave in a manner prescribed by the credit card issuer and achieve the communicated performance target during the target period. Although the periodic statement of some embodiments is a written communication between the issuer and the card holder, the communication could take any number of forms including updating a database accessible by the card holder (e.g., accessible via a website) or transmitting an electronic or facsimile representation (e.g., via an email) of a periodic statement.

In some embodiments, CCI 200 informs card holder 112 of the reward offer without outputting a periodic (or non-periodic) account statement. For example, the reward offer may be communicated to the card holder in various ways, including without limitation, updating a database accessible by the card holder (e.g., accessible via a website), or transmitting an electronic or facsimile representation (e.g., via an email) of the reward offer, without also providing an account statement.

As previously described with reference to FIG. 1, throughout the target period CCI 200 stores transaction data relating to the account of card holder 112. The transaction data is received from various merchants. At step 620, CCI 200 stores the received data in transaction table 500, and updates status field 422 based on a comparison of the aggregate transaction data to the performance target data stored in performance target table 400. Prior to the end of the target period, CCI 200 determines a second set of target and reward data based on the received transaction data in transaction table 500, the current period performance target and reward offer data in target/reward table 400. An example of the specific steps executed at step 622 are more fully described with reference to FIG. 8.

Finally, at the end of the current target period, CCI 200 determines whether a card holder has achieved the performance targets determined at step 612. A example of the specific steps executed at step 624 are more fully described with reference to FIG. 7. If the card holder has failed to achieve the performance targets determined at step 612, no rewards are awarded, as shown by step 628. If, however, the performance targets determined at step 612 have been achieved, CCI 200 updates the appropriate account data to reward card holder 112 for exhibiting the desired behavior, as shown by step 626.

In one or more embodiments, the credit card issuer also informs a card holder if the performance target has been achieved and/or if a reward has been applied. For example, the card holder may be informed via an account statement, by updating a database accessible by the card holder (e.g., accessible via a website), or by transmitting an electronic signal (e.g., via an email) indicating that the reward has been earned and/or a target has been achieved.

Figure 7:
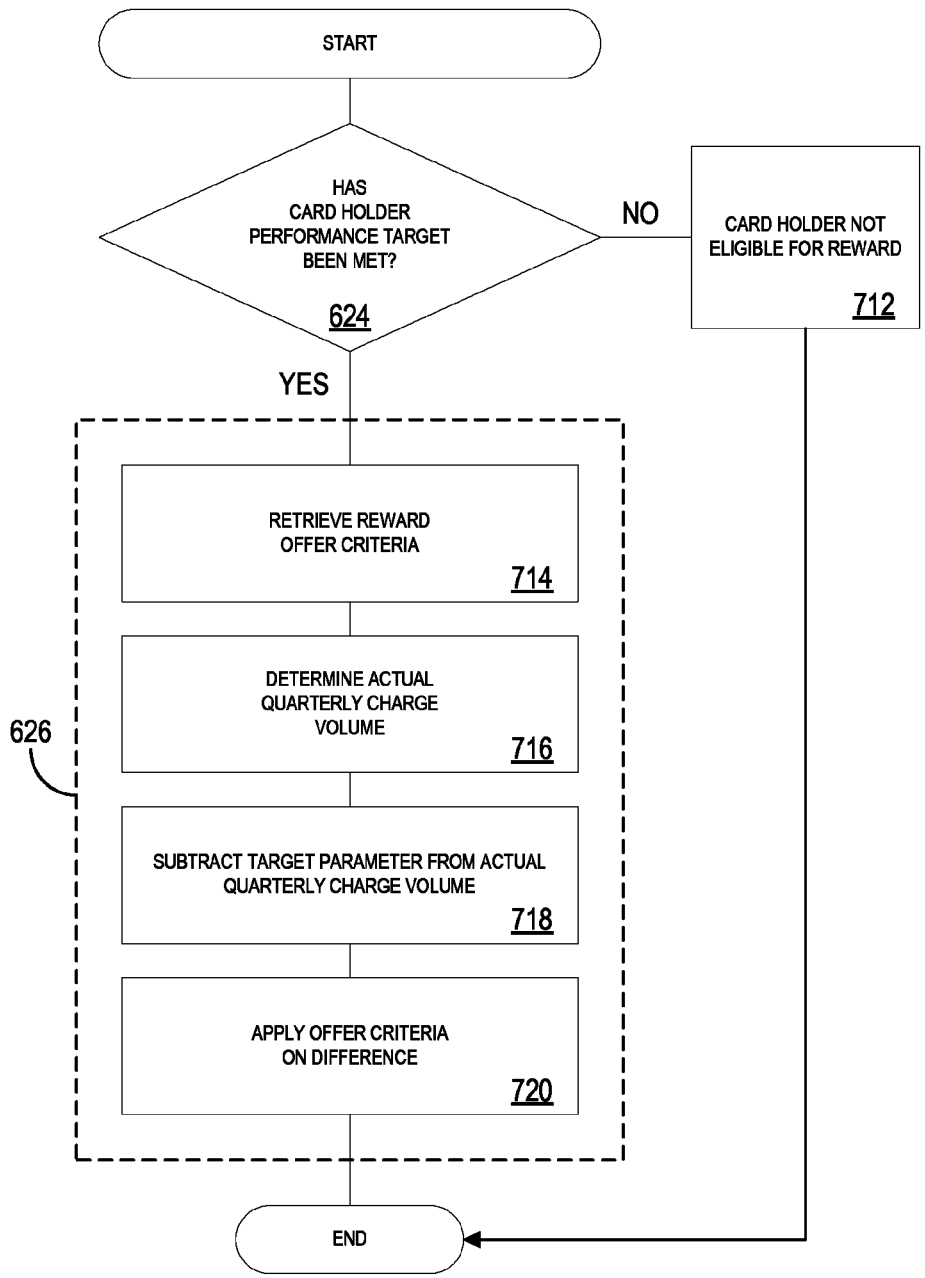
FIG. 7 is a flow chart illustrating the computer implemented steps used to determine earned rewards according to one or more embodiments of the present invention.

Referring now to FIG. 7, there is illustrated a specific example of the processing steps executed during steps 624 and 626 of FIG. 6. The specific example relates to the card holder account associated with record 350 of card holder account table 300 and record 450 of target/reward table 400. As shown by record 450, the card holder responsible for account having account ID 2222-3333-4444-5555 was offered a cash rebate reward of two percent of charges transacted during the first quarter of 1997 which exceed $1,500.00. At step 624, CCI 200 determines whether the quarterly charge volume for account 2222-3333-4444-5555 is equal to or greater than $1,500.00. This is preferably accomplished by examining status field 422 of record 450. As shown, the performance target defined by record 450 has been met.

If the card holder performance had failed to meet the performance target, the card holder would not be eligible for a reward, as shown at step 712. Since the card holder performance exceeds the performance target, CCI 200 executes the steps generally referred to by reference numeral 626 in FIG. 6. At step 714, CCI 200 accesses and retrieves the reward offer criteria from fields 418 and 420 of record 450. Based on fields 414 and 416 of record 450, CCI 200 determines the actual quarterly charge volume of the account at step 716. This may be performed in any number of well-known ways including, without limitation, accessing a defined field in an account header or calculating the amount using account record 350 and related records of transaction table 500.

At step 718, CCI determines the amount of quarterly charge volume exceeding the performance target by subtracting the actual quarterly charge volume determined at step 716 from $1,500.00, target parameter 416 of record 450. Finally, at step 720, CCI 200 applies the reward terms of two percent to the difference determined at step 718, and CCI 200 updates transaction table 400 to distribute the cash rebate.

Figure 8:
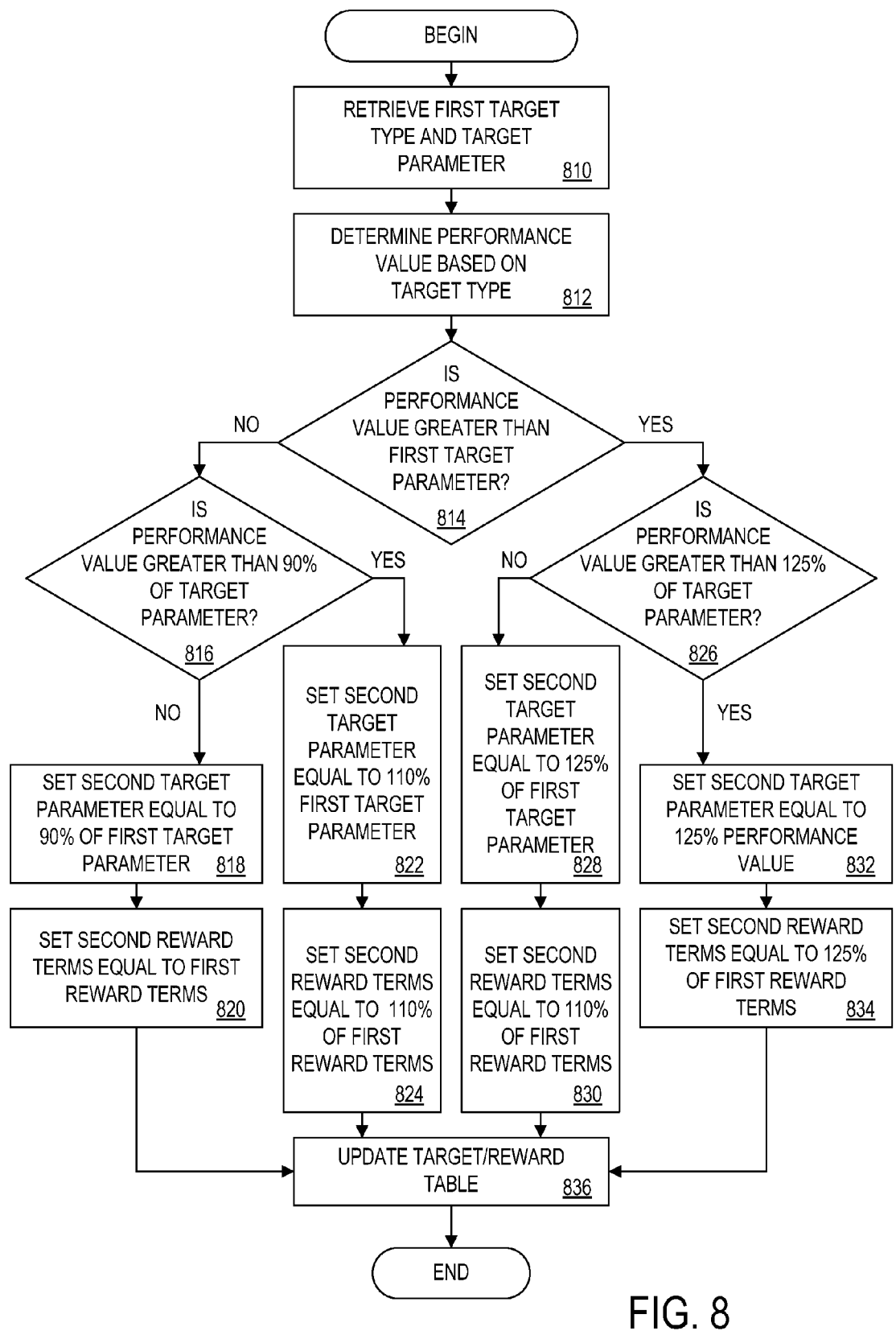
FIG. 8 is a flow chart illustrating the computer implemented steps used to periodically adjust performance targets according to one or more embodiments of the present invention.

Referring now to FIG. 8, there is a flow chart illustrating specific steps which may be executed to determine a second set of target and reward data. The steps depicted in FIG. 8 are merely illustrative of one specific implementation and are not intended to limit the scope of the present invention. Other embodiments which are within the scope of the present invention will be readily apparent to one of ordinary skill.

At step 810, CCI 200 retrieves first target type 414 and first target parameter 416 from target/reward table 400. Based on first target type 414, as shown at step 812, CCI 200 determines a card holder performance value representing the card holder's performance during the target period. The card holder performance value may be calculated based on historical transaction data in transaction table 500 or may be retrieved from card holder account table 300, such as from fields 322, 324 and 326. At step 814, CCI 200 compares the card holder performance value to first target parameter 416.

If the card holder performance value is less than or equal to the first target parameter 416, the card holder has not yet achieved the first performance target. In that case, CCI 200 processes step 816 and determines whether the card holder performance value is within 90% of the first target parameter 416. If the card holder performance value is less than or equal to 90% of the first target parameter 416, CCI 200 determines the second target parameter by multiplying the first target parameter by 0.9, and sets the second reward terms equal to the first reward terms, as shown at steps 818 and 820. This is intended to reduce the target to enable the cardholder to achieve it.

If the card holder performance value is greater than 90% of the first performance target, CCI 200 sets the second target parameter equal to 110% of the first target parameter and sets the second reward terms equal to 110% of the first reward terms, as shown at steps 822 and 824. This is intended to encourage the card holder to marginally exceed the original target and earn proportionally greater rewards.

Referring back to step 814, if the card holder performance value is greater than the first performance target, the card holder has achieved the first performance target. At step 826, CCI 200 determines whether the card holder performance value is more than 125% of the first performance target. If the card holder performance value is less than or equal to 125% of the first performance target, the card holder has only marginally exceeded the first performance target. In which case, CCI 200 sets the second target parameter at 1.25 times the first target parameter and sets the second reward terms at 1.1 times the first reward terms, as shown by steps 828 and 830. The second target and reward values are set to incent the card holder to exceed his present performance in the second period.

If the card holder performance value exceeds 125% of the first performance target, the card holder performance is considered exceptional. Accordingly, the second target parameter is set equal to 125% of the card holder performance value and the second reward terms are set equal to 125% of the first reward terms. By determining the second performance target based on the card holder's actual performance value, the exceptionally performing card holder is incented to step up his performance even more during the second period. As shown at step 836, a record is added to target/reward table 500 containing the second performance target and the second reward terms.

One or more embodiments of the present invention provide a method and system to define, manage and evaluate reward offers which are customized based on account criteria. Accordingly, account holders may be induced to exhibit behavior desired by an account issuer.

A method according to some embodiments of the present invention is provided for providing and managing a customized reward offer to a holder of a financial account. The method includes the step of accessing historical account data associated with the financial account. The method further includes the step of determining a first performance target associated with the financial account. The method also includes the steps of selecting a reward offer having an associated reward description and transmitting the first performance target and the reward description to the account holder. The method further includes collecting transaction data associated with the financial account and evaluating the collected transaction data to determine a second performance target associated with the financial account.

In some embodiments, the collected transaction data further is compared to the first performance target. If the collected transaction data exceeds the first performance target, the financial account is updated to reflect the reward.

A system according to one or more embodiments of the present invention is also provided for implementing one or more of the process embodiments described herein.

Some embodiments of the present invention provide the benefit of promoting the use of a financial account by enabling a credit card issuer to tailor targets and rewards based on characteristics of an individual financial account, or of one or more financial accounts. Other features and advantages of the various embodiments described herein will be readily apparent from the detailed description and from the accompanying drawings.

4. Additional Embodiments

In addition to various reward types described herein, other reward types may include discounts on products and/or services offered by the credit card issuer. For example, many credit card issuers offer services including, without limitation, insurance programs (e.g., credit insurance, travel insurance), and travel agency programs, and typically charge account holders a fee or premium (e.g., an annual fee, or a per-use cost) for providing the service. Other programs, products and/or services offered by credit card issuers to card holders will be known to those having skill in the art. As a reward, a credit card issuer may reduce or waive fees for such programs. In another example, some credit card issuers charge account holders various types of account fees (e.g., an annual account fee). As a reward, a credit card issuer may reduce or waive such fees.

Other reward types may include providing and/or extending warranties for goods purchased using the credit card account. For example, an account holder could be rewarded with a one-year extension of the warranties of all goods costing over $200. Of course, any particular warranty terms and target parameters could be set as desired by the credit card issuer. In some embodiments, the target parameter and/or the terms of an awarded warranty is based on account and/or transaction data associated with the account holder. For example, an account holder could be rewarded with a ninety day warranty of one or more purchased products for meeting a quarterly charge volume target of $1200.

In some embodiments, the rewards may be applied to a credit card account. In other embodiments, as discussed herein, rewards may be distributed to the account holder. For example, gifts and discount coupons may be distributed via a computer network, via email or by postal mail.

In some alternative embodiments, one or more rewards may be provided to the account holder or applied to an account before a target parameter is met (or even determined). For example, in some embodiments, a reward offer may inform the card holder that the credit card issuer has reduced (or will soon reduce) the card holder's annual percentage rate. In some other embodiments, in order to maintain the reward and/or avoid a penalty (e.g., in order to maintain a reduced annual percentage rate), the card holder must meet the performance target specified in the reward offer within the target period. If the card holder fails to meet the performance target within the target period, for example, the annual percentage may be raised or even restored to its prior level. Similarly, cash rebates and other types of rewards could be provided before a target is met and, if the card holder fails to meet the terms of the reward offer, the credit card issuer could void the rewards and/or require that rewards be returned (e.g., gifts or coupons would be returned or voided, an account balance would be adjusted to indicate the voiding of a rebate or credit). In some embodiments, the card holder may be penalized in excess of the value of the reward provided, for failing to meet the target associated with a previously-provided reward. For example, an account balance credited with a rebate of $15 may be charged $20 if the account holder fails to meet a performance target within the target period.

Evaluations of account data and/or transaction data related to charge volume, outstanding balance, and number of transactions within a given period are described herein. In some alternative embodiments, criteria may be established by the credit card issuer for determining whether a particular transaction indicated by account data and/or transaction data is eligible to be included in one or more measures or evaluations of the account and/or transaction data. To be qualified, a transaction may have to be, for example, greater than a threshold dollar amount, or associated with a specific merchant or type of merchant. Of course, various other criteria may be used, as deemed appropriate by the credit card issuer. In one example, in determining an average monthly number of transactions for an account holder, the credit card issuer may require that a transaction be for at least $10 in order to be included in the average. Similarly, in some embodiments, when determining target parameters and/or when transactions are compared to target parameters to determine whether a card holder is eligible for a reward, only those transactions meeting certain criteria (e.g., a threshold purchase amount, at a particular merchant) may be used in making the determinations.

Those familiar with the art to which the invention relates will recognize various alternative designs and embodiments for practicing the present invention. These alternative embodiments are within the scope of the present invention. Accordingly, the scope of the present invention embodies the scope of the claims appended hereto.

What is claimed is:
1. A method comprising:
   determining a performance target and a target period for an account;
   determining a reward associated with the performance target of the account;
   offering the reward to an account holder of the account;
   providing an indication of the performance target to the account holder;
   receiving, by a central controller device, transaction data associated with the account for the target period;
   comparing, by the central controller device, said transaction data to the performance target to determine a remaining transaction amount required to achieve the performance target;
   determining, via the central controller device, a second performance target for the account; and
   providing, via the central controller device, an indication of the second performance target to the account holder.

2. The method of claim 1, in which determining the performance target comprises basing the performance target on account data associated with the account.

3. The method of claim 2, wherein the account data comprises at least one of an average principal payment, an average balance transfer amount, an average charge volume, and an average number of transactions in a predetermined period.

4. The method of claim 1, in which determining the performance target comprises:
   determining the performance target based on historical account data associated with the account.

5. The method of claim 1, in which determining the performance target comprises:
   determining the performance target based on a specific merchant associated with the transaction data.

6. The method of claim 1, in which determining the performance target comprises:
   determining the performance target based on a type of merchant associated with the transaction data.

7. The method of claim 1, in which determining the performance target comprises:
   determining the performance target based on data associated with the account holder.

8. The method of claim 1, in which determining the performance target comprises:
   determining the performance target based on profile data associated with the account holder.

9. The method of claim 1, wherein the performance target comprises an average charge volume, and wherein the remaining transaction amount comprises the difference between the performance target and an aggregate charge volume.

10. The method of claim 1, in which providing an indication of the performance target comprises at least one of printing an account statement for the account holder, updating a database accessible by the account holder, displaying the indication on a website, or transmitting an electronic signal to the account holder.

11. The method of claim 1, in which offering the reward comprises at least one of printing an account statement for the account holder, updating a database accessible by the account holder, displaying the indication on a website, or transmitting an electronic signal to the account holder.

12. The method of claim 1, in which determining the reward comprises:
   determining preference data that is associated with the account; and
   determining the reward based on the preference data.

13. The method of claim 1, in which determining the reward comprises:
   receiving preference data generated by the account holder that is associated with the account; and
   determining the reward based on the preference data.

14. The method of claim 1, in which determining the reward comprises:
   transmitting a menu to an account holder that is associated with the financial account, wherein the menu indicates at least one reward offer.

15. The method of claim 1, in which determining the reward comprises:
   determining the reward based on account data associated with the account.

16. The method of claim 1, in which determining the reward comprises:
   determining the reward based on a specific merchant associated with the transaction data.

17. The method of claim 1, in which determining the reward comprises:
   determining the reward based on a type of merchant associated with the transaction data.

18. The method of claim 1, in which determining the reward comprises:
   determining the reward based on data associated with the account holder.

19. The method of claim 1, in which determining the reward comprises:
   determining the reward based on profile data associated with the account holder.

20. The method of claim 1, in which determining the reward comprises:
   determining the reward based on the transaction data.

21. The method of claim 1, in which determining the performance target comprises:
   determining the performance target based on the transaction data.

22. The method of claim 1, in which determining the second performance target comprises:
   determining the second performance target based on account data associated with the account.

23. The method of claim 1, in which determining the second performance target comprises:
   determining the second performance target based on historical account data associated with the account.

24. The method of claim 1, in which determining the second performance target comprises:
   determining the second performance target based on a specific merchant associated with the transaction data.

25. The method of claim 1, in which determining the second performance target comprises:
   determining the second performance target based on a type of merchant associated with the transaction data.

26. The method of claim 1, in which determining the second performance target comprises:
   determining the second performance target based on data associated with the account holder.

27. The method of claim 1, in which determining the second performance target comprises:
   determining the second performance target based on profile data associated with the account holder.

28. The method of claim 1, in which determining the second performance target comprises:
   determining the second performance target based on the transaction data.

29. The method of claim 1, further comprising:
   determining that at least one criterion for qualifying a transaction is satisfied.

30. The method of claim 29, wherein the at least one criterion comprises a transaction amount that is not less than a predetermined minimum amount.

31. The method of claim 29, wherein the at least one criterion comprises a transaction that is associated with at least one of a merchant or a merchant type.

32. The method of claim 1, further comprising providing the reward to the account holder.

33. The method of claim 1, wherein the reward comprises at least one of:
   a rebate;
   a discount;
   a gift;
   an increase of reward program points; and
   an increase of an amount of frequent flyer miles.

34. A non-transitory computer readable storage device storing instructions configured to direct a processor to:
   determining a performance target and a target period for an account;
   determining a reward associated with the performance target of the account;
   offering the reward to an account holder of the account;
   providing an indication of the performance target to the account holder;
   receiving, by a central controller device, transaction data associated with the account for the target period;
   comparing, by the central controller device, said transaction data to the performance target to determine a remaining transaction amount required to achieve the performance target;
   determining, via the central controller device, a second performance target for the account; and
   providing, via the central controller device, an indication of the second performance target to the account holder.

35. An apparatus, comprising:
   a processor; and
   a storage device operably connected to the processor, wherein the storage device stores instructions configured to direct the processor to perform:
      determining a performance target and a target period for an account;
      determining a reward associated with the performance target of the account;
      offering the reward to an account holder of the account;
      providing an indication of the performance target to the account holder;
      receiving transaction data associated with the account for the target period;
      comparing said transaction data to the performance target to determine a remaining transaction amount required to achieve the performance target;
      determining a second performance target for the account; and
      providing an indication of the second performance target to the account holder.

* * * * *